J. C. LIGHTHOUSE.
WHEEL TIRE.
APPLICATION FILED NOV. 18, 1908.
969,890.
Patented Sept. 13, 1910.
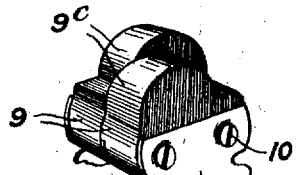
FIG. 7.
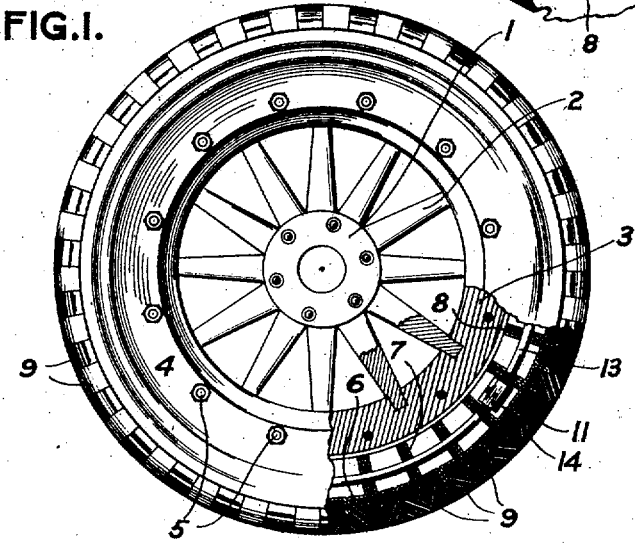
FIG. 1. FIG. 2.
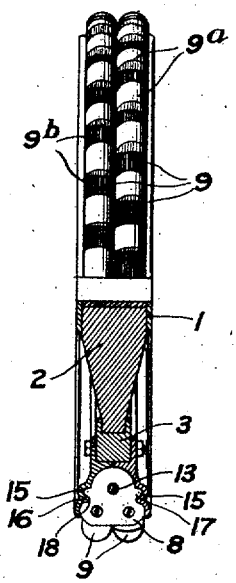
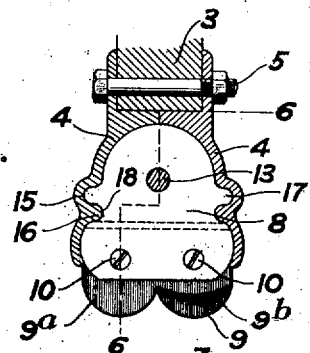
FIG. 3.
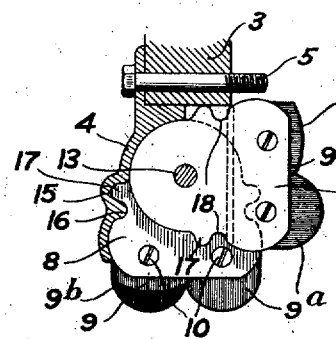
FIG. 4.
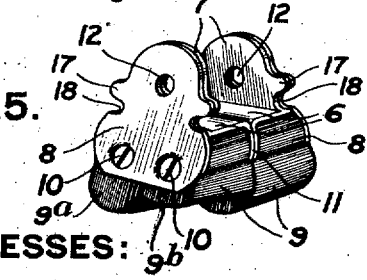
FIG. 5.
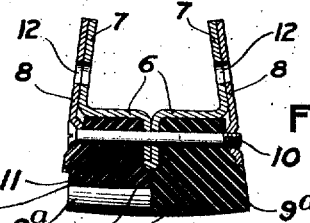
FIG. 6.
WITNESSES:
L. Thon
C. W. Carroll
INVENTOR:
John C. Lighthouse
by Ogark & Davis
his atty.

UNITED STATES PATENT OFFICE.

JOHN C. LIGHTHOUSE, OF ROCHESTER, NEW YORK.

WHEEL-TIRE.

969,890.   Specification of Letters Patent.   Patented Sept. 13, 1910.

Application filed November 18, 1908. Serial No. 463,293.

*To all whom it may concern:*

Be it known that I, JOHN C. LIGHTHOUSE, a citizen of the United States, and resident of Rochester, in the county of Monroe and State of New York, have invented certain new and useful Improvements in Wheel-Tires, of which the following is a specification.

This invention relates to wheel tires, and consists in the apparatus hereinafter described and claimed.

The object of the invention is to provide a tire having a sectional felly, whose tread surface is composed of blocks of somewhat compressible material, and which blocks are removable and replaceable in case one is damaged.

In the drawings: Figure 1 is a side elevation of a wheel having this invention applied thereto, part being broken away to show construction; Fig. 2 is a front elevation of such a wheel, part also being broken away to exhibit construction; Fig. 3 is an enlarged cross-section of a portion of the tire when in the operative position; Fig. 4 is an enlarged cross-section of the same part of the tire, having one of the clamping plates removed, and one of the tire blocks turned into position for removal or replacement of a tread block; Fig. 5 is a perspective view of the complete tire section; Fig. 6 is a section on the line 6—6 of Fig. 3; and Fig. 7 is a perspective view of a modification.

In the drawings, 1 is a wheel hub, 2 are a series of spokes projecting therefrom, and 3 is a felly. All of these may be of the usual form, except that the felly is made of such proper shape as to permit two separable side plates 4, 4 to be clamped thereon in any suitable way, as by the bolts 5. On each side of the felly 3 is one of the side plates 4, and bolts 5 pass through the side plates and felly and fasten the parts together. Between the side plates and outside the felly are fastened a series of tire blocks, which are so formed as to produce sockets or box-like structures, open on the sides and closed at the ends, in which are fastened a series of the compressible tire blocks of any suitable material, such as india-rubber. Some of these substances are adapted for certain purposes better than others.

In the form of tire section herein shown, there is a bottom plate 6 having its ends turned down to form flanges 7. On the outside of these flanges fit end plates 8, 8, projecting beyond the bottom plate 6, and preferably registering in contour with the flanges 7. Between the end plates are fastened the tread blocks 9, and through the end plates and through the tread blocks pass bolts 10. These bolts may be of screw form, and have heads of the ordinary screw type setting in depressed sockets in one of the end plates and threaded to engage threads in the other end plate, so that on turning the bolt, the end plates are pulled together against the outer surfaces of the tread blocks 9. It is preferable to provide means between the end plates for preventing movement of the blocks along the bolts 10, and for this purpose a portion of the bottom plate 6 may be bent up to form a rib 11, arranged transversely, as shown, and substantially parallel to the planes of the end plates 8 and midway between them. In this case a pair of tread blocks 9 may be employed, having the rib 11 between them. By this method of construction, the tread blocks 9 are somewhat compressed at their bottoms by means of the screws or bolts 10 when all the parts are in the position shown in the drawing.

Through the end plates and through the flanges in the bottom plate are registering perforations 12, so that the tread-block holder, consisting of the end plates 8 and the bottom plate 6, may be strung upon a ring 13 arranged around the periphery of the felly 3 and between the side plates 4. The ends of the flanges 7 and of the end plates 8 are so formed that when the right-hand side plate has been removed, which may be done upon removing the nuts from the bolts 5, the tire section, consisting of the tread blocks and the said holder, may be turned from the ordinary tread position to a position substantially at right angles thereto, as shown in Fig. 4, whereby the heads of the bolts 10 are uncovered, and by unscrewing the same, the tread blocks 9 may be removed for replacement if desired. On turning any tire section again to the position shown in Fig. 3, and tightening the ring 13, the parts are tightened against the felly in an obvious manner. Any suitable way of tightening the ring 13 may be employed. A right and left hand nut 14 on the ends of the ring is one practical method of performing this function.

Means are provided for preventing the tire sections from turning in the side plates 4, and for this purpose intermeshing irregularities in the sides of the holder and in the side plates 4 are provided, as shown for instance in Fig. 3. On the inner side of each side plate there is a groove 15, and a projection 16, and on the sides of the flanges 7 and of the end plates 8 (either or both) are projections 17 fitting in the sockets 15, and depressions 18 fitting on the projection 16 of the side plates. When the side plate is removed, as in Fig. 4, to permit the independent pivotal movement of one or more of the tire sections, the ring 13 is free to be sprung or moved to one side at the required point sufficiently to permit the projections 17 on the tire sections in question to be disengaged from the corresponding groove so as to permit the pivotal movement. When the tire sections are all strung on the rod 13, and before the latter is tightened, the sections may be put in place against one of the side plates 4 (the other being removed), and then the rod 13 may be tightened so that the irregularities 17 and 18 of the tire sections fit into the irregularities 15 and 16 of the side plate. Then the other side plate is put upon the wheel with its irregularities fitting those on the corresponding side of the tire sections, the removed side plate is bolted firmly in place, and the wheel is ready for use.

A type of tread block adapted for use in this type of wheel tire is shown herewith as having a tread face that is depressed along the circumferential center-line, and having a part $9^a$ on one side of said center-line that projects farther outward than the part $9^b$ on the opposite side. In constructing the tire-sections, two blocks 9 are placed together between the plates 8, so that the part $9^a$ on one block lies adjacent to the part $9^b$ on the other block, and vice versa (Fig. 5). The wheel when assembled with this type of tread blocks presents the appearance of Figs. 1 and 2. It may be readily seen that the surface presented to the pavement offers a greater number of projections than a smooth-faced tire, and said projections coöperate with the projections of a rough road and prevent slipping. Furthermore, the interstices between the parts $9^a$ give room for the latter to expand longitudinally when compressed.

A surface more continuous but fully as effective, is presented to the road if the projections on adjacent blocks overlap each other laterally. Such a construction is shown in Fig. 7, in which the lugs or projections $9^c$ are more than half as wide as the whole block 9.

What I claim is:

1. A wheel; side plates projecting peripherally therefrom and forming a groove between them and removable on one side; a series of tire sections in said groove; and means for pivoting each tire section to the wheel on a circumferential axis, whereby, after removal of said one side, each tire section is rotatable on its pivotal axis.

2. A wheel; side plates projecting peripherally therefrom and forming a groove between them and removable on one side; a series of tire sections in said groove having circumferentially arranged perforations; and a circumferential rod passing through said perforations for pivoting each tire section to the wheel on a circumferential axis, whereby, after removal of said one side, each tire section is rotatable on its pivotal axis.

3. A wheel; side plates projecting peripherally therefrom and forming a groove between them and removable on one side; a series of tire sections in said groove having circumferentially arranged perforations; a circumferential rod passing through said perforations; and means for expanding and contracting said rod, whereby each tire section is pivoted to the wheel on a circumferential axis, and, after removal of said one side, is rotatable on its pivotal axis.

4. A wheel; side plates projecting peripherally therefrom and forming a groove between them and removable on one side, and provided with means for interlocking with tire sections; a series of tire sections in said groove provided with means for interlocking with said side plates; and means for pivoting each tire section to the wheel on a circumferential axis, whereby, after removal of said one side, each tire section is rotatable on its pivotal axis.

5. In combination with a wheel, a plurality of tire sections, each comprising a tread holder, a removable tread block therein and means for securing the tread block in the tread holder, and means for pivoting the tire sections circumferentially and end to end upon the wheel, said means having provision for independent pivotal movement of each tire section to one side of its normal position to facilitate the removal of the tread block therefrom.

6. In combination with a wheel, a plurality of tire sections, each comprising a tread holder, a removable tread block therein and means accessible only from the end of the tire section for securing the tread block in the tread holder, and means for pivoting the tire sections circumferentially and end to end upon the periphery of the wheel, said means having provision for independent pivotal movement of each tire section to one side of its normal position to permit access to the ends thereof.

7. In combination with a wheel, a plurality of tire sections, each comprising a tread holder, a removable tread block therein and means accessible only from the end of the tire section for securing the tread block in the tread holder, means for pivoting the tire sections circumferentially and end to end upon the wheel, and two side plates engaging the tire sections laterally and formed and arranged to prevent pivotal movement of the tire sections.

8. A wheel; side plates projecting peripherally therefrom and forming a groove between them and removable on one side; a series of tire sections in said groove having inwardly projecting plates and tread blocks between said plates and fastened thereto by longitudinal bolts; and means for pivoting each tire section to the wheel on a circumferential axis, whereby, after removal of said one side, each tire section is rotatable on its pivotal axis for access to said bolts for removal of said tread blocks.

9. A wheel; side plates projecting peripherally therefrom and forming a groove between them and removable on one side; a series of tire sections in said groove having circumferentially arranged perforations and inwardly projecting plates and tread blocks between said plates and fastened thereto by longitudinal bolts; a circumferential rod passing through said perforation and constituting means for pivoting each tire section to the wheel on a circumferential axis, whereby, after removal of said one side, each tire section is rotatable on its pivotal axis for access to said bolts for removal of said tread blocks.

10. A wheel; side plates projecting peripherally therefrom and forming a groove between them and removable on one side; a series of tire sections in said groove having circumferentially arranged perforations and inwardly projecting plates and tread blocks between said plates and fastened thereto by longitudinal bolts; a circumferential rod passing through said perforations; and means for expanding and contracting said rod, whereby each tire section is pivoted to the wheel on a circumferential axis, and, after removal of said one side, is rotatable on its pivotal axis for access to said bolts for removal of said tread blocks.

11. A wheel; side plates projecting peripherally therefrom and forming a groove between them and removable on one side, and provided with means for interlocking with tire sections; a series of tire sections in said groove provided with means for interlocking with said side plates and having inwardly projecting plates and tread blocks between said plates and fastened thereto by longitudinal bolts; and means for pivoting each tire section to the wheel on a circumferential axis, whereby, after removal of said one side, each tire section is rotatable on its pivotal axis for access to said bolts for removal of said tread blocks.

JOHN C. LIGHTHOUSE.

Witnesses:
ELIZABETH F. LIGHTHOUSE,
D. GURNEE.